US012164366B2

(12) United States Patent
Sethi et al.

(10) Patent No.: US 12,164,366 B2
(45) Date of Patent: Dec. 10, 2024

(54) DISK FAILURE PREDICTION USING MACHINE LEARNING

(71) Applicant: Dell Products L.P., Round Rock, TX (US)

(72) Inventors: Parminder Singh Sethi, Ludhiana (IN); Madhuri Dwarakanath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/077,875

(22) Filed: Dec. 8, 2022

(65) Prior Publication Data

US 2024/0193024 A1 Jun. 13, 2024

(51) Int. Cl.
*G06F 11/00* (2006.01)
*G06F 11/07* (2006.01)
*G06N 20/20* (2019.01)

(52) U.S. Cl.
CPC ...... *G06F 11/0751* (2013.01); *G06F 11/0727* (2013.01); *G06N 20/20* (2019.01)

(58) Field of Classification Search
CPC ............. G06F 11/0793; G06F 11/0712; G06F 11/079; G06F 11/3476
USPC ........................................................ 714/1–57
See application file for complete search history.

(56) References Cited

U.S. PATENT DOCUMENTS 10,013,323 B1 * 7/2018 Puhov ................. G06F 11/0727
10,558,547 B2 * 2/2020 Coatney ................ G06F 11/004
2002/0156975 A1 * 10/2002 Staub .................. G06F 11/1471 711/170
2007/0294565 A1 * 12/2007 Johnston ............. G06F 11/1076 714/E11.034
2010/0205372 A1 * 8/2010 Daikokuya ........... G06F 3/0632 714/E11.089
2013/0311835 A1 * 11/2012 Dunne ................ G06F 11/0793 714/E11.195
2013/0205166 A1 * 8/2013 Nair .................... G06F 11/1092 714/E11.122
2015/0033233 A1 * 1/2015 Hosokawa .............. G06F 11/30 718/102
2015/0370619 A1 * 12/2015 Nagura ............... G06F 11/0793 719/318

(Continued)

OTHER PUBLICATIONS

Wikipedia, "Conformal Prediction," https://en.wikipedia.org/w/index.php?title=Conformal_prediction&oldid=1109881163, Sep. 12, 2022, 6 pages.

*Primary Examiner* — Sarai E Butler
(74) *Attorney, Agent, or Firm* — Ryan, Mason & Lewis, LLP

(57) ABSTRACT

Techniques for prediction of remaining life and failure of disks are disclosed. For example, a method comprises collecting operational data of a plurality of disks, and identifying at least one disk of the plurality of disks as failing based at least in part on a portion of the operational data associated with the at least one disk. Using one or more machine learning algorithms, a time period when the at least one disk will remain operational is predicted based at least in part on the portion of the operational data associated with the at least one disk. An operation to write contents of the at least one disk on at least one replacement disk is executed, wherein the operation is initiated at a time based at least in part on the predicted time period.

20 Claims, 8 Drawing Sheets

600

602 COLLECT OPERATIONAL DATA OF A PLURALITY OF DISKS

604 IDENTIFY AT LEAST ONE DISK OF THE PLURALITY OF DISKS AS FAILING BASED AT LEAST IN PART ON A PORTION OF THE OPERATIONAL DATA ASSOCIATED WITH THE AT LEAST ONE DISK

606 PREDICT, USING ONE OR MORE MACHINE LEARNING ALGORITHMS, A TIME PERIOD WHEN THE AT LEAST ONE DISK WILL REMAIN OPERATIONAL BASED AT LEAST IN PART ON THE PORTION OF THE OPERATIONAL DATA ASSOCIATED WITH THE AT LEAST ONE DISK

608 EXECUTE AN OPERATION TO WRITE CONTENTS OF THE AT LEAST ONE DISK ON AT LEAST ONE REPLACEMENT DISK, WHEREIN THE OPERATION IS INITIATED AT A TIME BASED AT LEAST IN PART ON THE PREDICTED TIME PERIOD

(56) References Cited

U.S. PATENT DOCUMENTS

| | | | | |
|---|---|---|---|---|
| 2016/0188424 | A1* | 6/2016 | Walls | G06F 11/1662 714/6.3 |
| 2017/0279822 | A1* | 9/2017 | Lord | H04L 63/1433 |
| 2018/0074748 | A1* | 3/2018 | Makin | G06F 9/4856 |
| 2018/0082201 | A1* | 3/2018 | Cantwell | G06F 11/079 |
| 2019/0318266 | A1* | 10/2019 | Kim | G06F 18/24323 |
| 2020/0409809 | A1* | 12/2020 | Liu | G06F 11/1662 |
| 2021/0383206 | A1* | 12/2021 | Teppoeva | G06F 11/004 |
| 2022/0108167 | A1* | 4/2022 | Upadhyay | G06F 3/061 |
| 2022/0215273 | A1 | 7/2022 | Sethi et al. | |

* cited by examiner

300

| MSE | Corr | AvMSE | VarMSE | DEOMSE | AEEMSE | Valid | Region | Size | NoIrr | Time |
|---|---|---|---|---|---|---|---|---|---|---|
| 0.4446 | NaN | 0.4465 | 0.0019 | 0.0061 | 0.0894 | 0.95 | 1.991 | 100.0 | 100.0 | 0.0536 |

```
Method
    learningType = MondrianForest.Survival()
    modeltype = forest
    notrees = 100
    minleaf = 1
    maxdepth = 0
    randsub = all
    randval = true
    splitsample = 0
    bagging = true
    bagsize = 1.0
    modpred = false
    laplace = false
    confidence = 0.95
    conformal = default
```

| **Disk Size** | **Rebuild Time** | **Storage Device** |
| --- | --- | --- |
| 250 GB | 6 hours, 56 minutes | PowerStore |
| 500 GB | 13 hours, 53 minutes | PowerStore |
| 1000 GB | 1 day, 3 hours | PowerStore |

FIG. 5

DISK FAILURE PREDICTION USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to disk management in such information processing systems.

BACKGROUND

Within a datacenter, disks may fail and require replacement. To support this operation, a redundant array of independent disks (RAID) can be used. When a disk fails, a replacement disk (referred to herein as a "hot spare") is used to replace the failed disk. Although the failed disks may be replaced, rebuilding the data on the replacement disks is time consuming. In addition, the replacement process may result in performance issues that can affect servers and applications.

SUMMARY

Embodiments provide disk management techniques in an information processing system.

For example, in one embodiment, a method comprises collecting operational data of a plurality of disks, and identifying at least one disk of the plurality of disks as failing based at least in part on a portion of the operational data associated with the at least one disk. Using one or more machine learning algorithms, a time period when the at least one disk will remain operational is predicted based at least in part on the portion of the operational data associated with the at least one disk. An operation to write contents of the at least one disk on at least one replacement disk is executed, wherein the operation is initiated at a time based at least in part on the predicted time period.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts example pseudocode for implementing conformal prediction of survival time of a disk in an illustrative embodiment.

FIG. 5 depicts a table including different disk sizes and their corresponding rebuild times in an illustrative embodiment.

DETAILED DESCRIPTION

Figure 1:
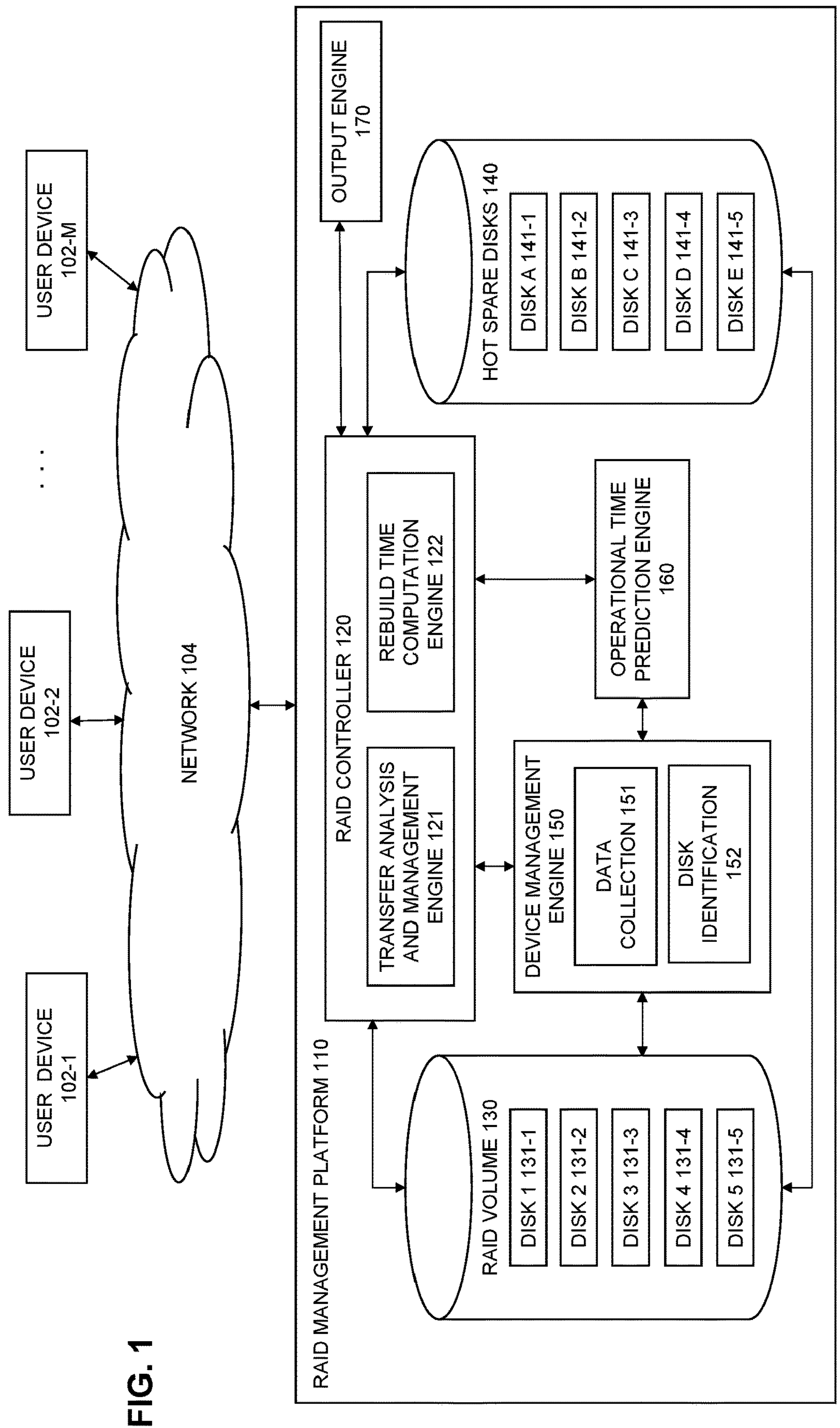
FIG. 1 depicts an information processing system with a RAID management platform for predicting and managing disk failure in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "disk" is intended to be broadly construed to encompass, for example, any type of storage drive or device, including solid state drives (SSDs), and is not limited to hard disk drives (HDDs) or other types of disk-based storage devices. Such SSDs are implemented using non-volatile memory (NVM) devices such as flash memory. Other types of NVM devices that can be used to implement at least a portion of the storage devices include non-volatile random access memory (NVRAM), phase-change RAM (PC-RAM) and magnetic RAM (MRAM). These and various combinations of multiple different types of NVM devices or other storage devices may also be used. For example, HDDs can be used in combination with or in place of SSDs or other types of NVM devices.

As used herein, "storage devices" are intended to be broadly construed to encompass, for example, logical storage devices such as logical units (LUNs) or other logical storage volumes, SSDs, HDDs, flash drives, hybrid drives or other types of storage products and devices, or portions thereof. A logical storage device can be defined in a storage array to include different portions of one or more physical storage devices.

A given input-output (IO) operation as that term is broadly used herein illustratively comprises one or more read and/or write commands as well as other types of commands. Such commands in some embodiments more particularly comprise Small Computer System Interface (SCSI) commands, although other types of commands can be used in other embodiments. References herein to terms such as "input-output" and "IO" should be understood to refer to input and/or output. Thus, an IO operation relates to at least one of input and output.

A redundant array of independent disks (RAID) works by combining multiple disks to manage various IO operations in a balanced way and by incrementally improving performance. Along with the main disks, multiple empty disks are also allocated as hot spares while configuring a RAID volume. When there is a disk failure in a RAID, one or more hot spares are used in a rebuild of the main RAID configuration to keep the IO operations active.

Current approaches are reactive to disk failures. For example, with conventional techniques, a hot spare functions only as an alternative when a main disk fails. After a main disk in a RAID volume fails, the data is rebuilt on a hot spare. A hot spare remains idle until there is a disk failure, and when a failure occurs, the data on the main disk is automatically rebuilt on the hot spare in the background. Depending on data size, the data rebuild may consume a large amount of time. For example, for 250 GB or 500 GB of data, a data rebuilding operation may take about 7 or 14 hours, respectively, in which there is a time gap in data availability.

The illustrative embodiments address the above technical problems by providing techniques which use machine learning to proactively predict a remaining operational life of a RAID disk identified as failing so that a data rebuilding process on a hot spare disk can be commenced and completed before a main disk fails. As a result, the contents of the main disk can be added to the hot spare, and the hot spare implemented without any resulting downtime of the RAID.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a RAID management platform 110. The variable M and other similar index variables herein such as K and L are assumed to be arbitrary positive integers greater than or equal to one.

The user devices 102 can comprise, for example, desktop, laptop or tablet computers, servers, host devices, storage devices, mobile telephones, Internet of Things (IoT) devices or other types of processing devices capable of communicating with the RAID management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. It is to be understood that although the embodiments are discussed in terms of user devices 102 (e.g., customer or client devices), the embodiments are not necessarily limited thereto, and may be applied to different devices (e.g., edge or cloud devices).

The terms "user," "customer," "client" or "administrator" herein are intended to be broadly construed so as to encompass numerous arrangements of human, hardware, software or firmware entities, as well as combinations of such entities. RAID management services may be provided for users utilizing one or more machine learning models, although it is to be appreciated that other types of infrastructure arrangements could be used. At least a portion of the available services and functionalities provided by the RAID management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the RAID management platform 110, as well as to support communication between the RAID management platform 110 and connected devices (e.g., user devices 102) and/or other related systems and devices not explicitly shown.

In some embodiments, the user devices 102 are assumed to be associated with repair and/or support technicians, system administrators, information technology (IT) managers, software developers, release management personnel or other authorized personnel configured to access and utilize the RAID management platform 110.

The performance of disks in a RAID may degrade over time to the point of failure. As noted above, with conventional approaches, disk failure typically occurs before any corrective action is taken. In an effort to address the above technical problems, illustrative embodiments identify disk issues prior to disk failure and use a conformal prediction framework to predict a remaining operational life (e.g., remaining days/hours/minutes, etc.) of a failing disk with a confidence factor. A "failing disk" as used herein is intended to be broadly construed to refer to a disk that is displaying symptoms of potential failure such as, for example, decreased performance and/or generated alerts identifying one or more issues with the disk. Advantageously, in accordance with illustrative embodiments, when a disk is identified as failing, disk content rebuilding activities on a hot spare disk are able to be commenced and completed before the disk fails so that the hot spare disk can be activated and data made available to a user when the actual failure occurs.

The RAID management platform 110 in the present embodiment is assumed to be accessible to the user devices 102 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the RAID management platform 110 includes a RAID controller 120, a RAID volume 130, hot spare disks 140, a device management engine 150, an operational time prediction engine 160 and an output engine 170. The RAID controller 120 comprises a transfer analysis and management engine 121 and a rebuild time computation engine 122. The device management engine 150 comprises a data collection layer 151 and a disk identification layer 152. The RAID volume 130 includes a plurality of main disks (e.g., disk 1 131-1, disk 2 131-2, disk 3 131-3, disk 4 131-4 and disk 5 131-5) (collectively "main disks 131"). The hot spare disks 140 include a plurality of hot spare disks (e.g., disk A 141-1, disk B 141-2, disk C 141-3, disk D 141-4 and disk E 141-5) (collectively "hot spare disks 141"). The hot spare disks 141 comprise empty disks on standby mode to be used to replace the main disks 131. While the illustrated number of main disks 131 and hot spare disks 141 is five, the number of main and hot spare disks 131 and 141 is not limited to 5, and there may be more or less than five main and hot spare disks 131 and 141. In addition, the number of hot spare disks 141 can differ from the number of main disks 131.

The RAID controller 120 implements methods that are configured to distribute, organize, and manage data across the main disks 131 to implement a RAID volume 130 according to a given RAID level configuration (e.g., RAID 5, RAID 6, etc.). The RAID controller 120 implements methods to perform functions such as striping, mirroring, parity computation, etc., to implement a RAID volume 130 depending on the given RAID level configuration. More specifically, the RAID controller 120 implements data striping methods that are configured to support RAID schemes which implement data striping techniques to distribute data over a plurality of main disks 131. The data striping methods are configured to divide data into resiliency units called "stripes" wherein each stripe comprises a plurality of equal-sized data blocks, referred to as "strips." In some embodiments, the strips of a given stripe are stored on different main disks 131 of different storage nodes, which are provisioned to implement the RAID volume 130. It is to be understood that the term "stripe" as used herein refers to suitable type of storage unit, including, but not limited to, RAID stripes.

As explained in more detail herein, the RAID controller 120, more particularly, the transfer analysis and management engine 121 and the rebuild time computation engine 122, implements methods for rebuilding of hot spare disks 141 prior to one or more failures of the main disks 131. In some embodiments, the RAID controller 120 is configured to implement different types of RAID levels (e.g., RAID 5, RAID 6, etc.). In accordance with exemplary embodiments of the disclosure, the RAID controller 120 generates and manages one or more striped storage volumes (or striped logical volumes) that are associated with RAID level configurations.

According to illustrative embodiments, the transfer analysis and management engine 121, rebuild time computation engine 122, device management engine 150 and operational time prediction engine 160 are utilized to trigger a data rebuilding process to proactively start on a hot spare disk before a main disk fails. The device management engine 150, more particularly, the data collection layer 151, collects operational data associated with the main disks 131. The operational data further corresponds to associated devices (e.g., servers, host devices, etc.) in a computing environment in which the main disks 131 are running. The data collection layer 151 collects operational data corresponding to the operation of the main disks 131 and of other components (e.g., servers) associated with the RAID volume 130. The data can be collected using one or more data collection applications such as, but not necessarily limited to, SupportAssist Enterprise and CloudIQ available from Dell Technologies. In illustrative embodiments, the data collection layer 151 collects the operational data by tracking service requests, through scheduled collections at designated times and/or through event-based collections. For example, when service requests for repair or other issues corresponding to given ones of the main disks 131 are initiated, the data collection layer 151 collects operational data associated with the subject disk and/or components identified in the service request. Scheduled collections occur at pre-defined times or intervals specified by, for example, a user via one or more user devices 102 or automatically scheduled by the data collection layer 151. Event-based collections are triggered by one or more events such as, but necessarily limited to, alerts about disk performance, a detected degradation of performance of a disk, installation of new software or firmware, the occurrence of certain operations, etc. In some embodiments, an integrated Dell® remote access controller (iDRAC) causes the data collection layer 151 to collect operational data from one or more main disks 131 and/or associated servers and export the collected operational data to a location (e.g., database or cache) on the RAID management platform 110 or to a shared network location (e.g., centralized database).

The disk identification layer 152 evaluates the health of the main disks 131 and associated components for changes in performance metrics (e.g., decreases in input-output operations per second (IOPS) and throughput, increases in latency, read and/or write delays and/or failures, etc.) to identify main disks 131 that may be failing (e.g., may potentially fail). In addition, the disk identification layer 152 evaluates the health of the main disks 131 based on alerts that may have been generated in connection with problems occurring with the main disks 131 and/or associated components. Such alerts are collected and processed by the data collection layer 151.

The operational time prediction engine 160 uses a conformal prediction framework to predict the survival time of a failing disk with a confidence percentage. Using one or more machine learning algorithms, the operational time prediction engine 160 predicts a time period when a failing disk will remain operational. The prediction is based at least in part on operational data associated with the failing disk.

The transfer analysis and management engine 121 uses the predicted survival time and a rebuild time computed by the rebuild time computation engine 122 to determine when to prepare one or more of the hot spare disks 141 to replace the failing one of the main disks 131 before the main disk fails. An operation to write contents of the failing one of the main disks 131 on one or more of the hot spare disks 141 is initiated at a time based at least in part on the predicted survival time and the computed rebuild time. For example, the time the operation is initiated is based at least in part on the operation being completed before expiration of the predicted survival time.

In illustrative embodiments, the one or more machine learning algorithms are used by the operational time prediction engine 160 to predict if a failing disk can survive and if so, to predict the time period (e.g., days/hours/minutes, etc.) when the failing disk will remain operational. The one or more machine learning algorithms comprise a conformal prediction model, which is a flexible learning model that uses historical data to determine precise levels of confidence in new predictions. For example, the model is trained on historical operational data including instances of disk failure.

Figure 2:
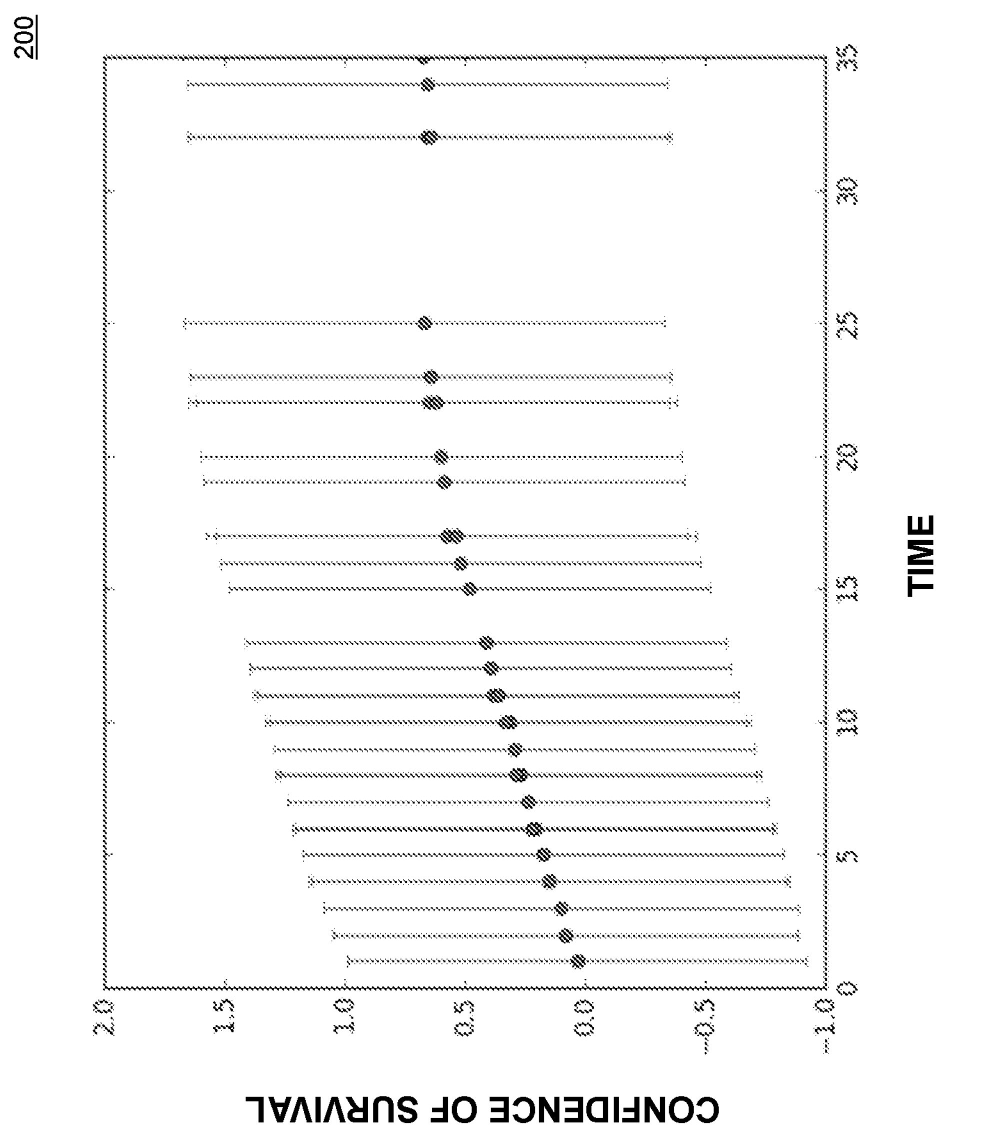
FIG. 2 depicts a graph of survival confidence versus time in an illustrative embodiment.

Based on the operational data collected by the data collection layer 151, an incremental learning approach is used to predict the survival time of a failing disk and the conformal prediction framework is used to increase the reliability of the prediction. For example, a Mondrian forest model is used, wherein the predicting comprises (i) computing a non-conformity score for a semi-parametric Mondrian forest; (ii) determining one or more uncertainties for a prediction; and (iii) translating the one or more uncertainties into a confidence interval for the prediction. The model continuously learns and adds new information to the learning model. Using this approach, a non-conformity score for a semi-parametric Mondrian forest is computed and used to determine the uncertainties with each prediction. These uncertainties are translated into a confidence interval of each prediction. For example, referring to the graph 200 in FIG. 2, the x-axis represents time and the y-axis represents the survival confidence of a disk. For each data sequence, the middle point on each bar represents the average confidence, and the bars quantify the upper and lower limits of confidence (e.g., confidence interval). Note that a Mondrian forest model is an example of a random forest model.

The survival analysis accounts for the relationship between various input features (e.g., operational data, type of disk, failure occurrences, etc.) and the duration of time until an event of interest occurs (e.g., failure of a main disk of the RAID volume). In illustrative embodiments, a prediction task considers one specific time point for each test instance. FIG. 3 depicts example pseudocode 300 for implementing conformal prediction of survival time of a disk. As can be seen in FIG. 3, in applying the conformal prediction model, a random forest model with multiple trees (e.g., ≥100 trees) is used for computing a conformity value of the respective predicted survival times.

Figure 4:
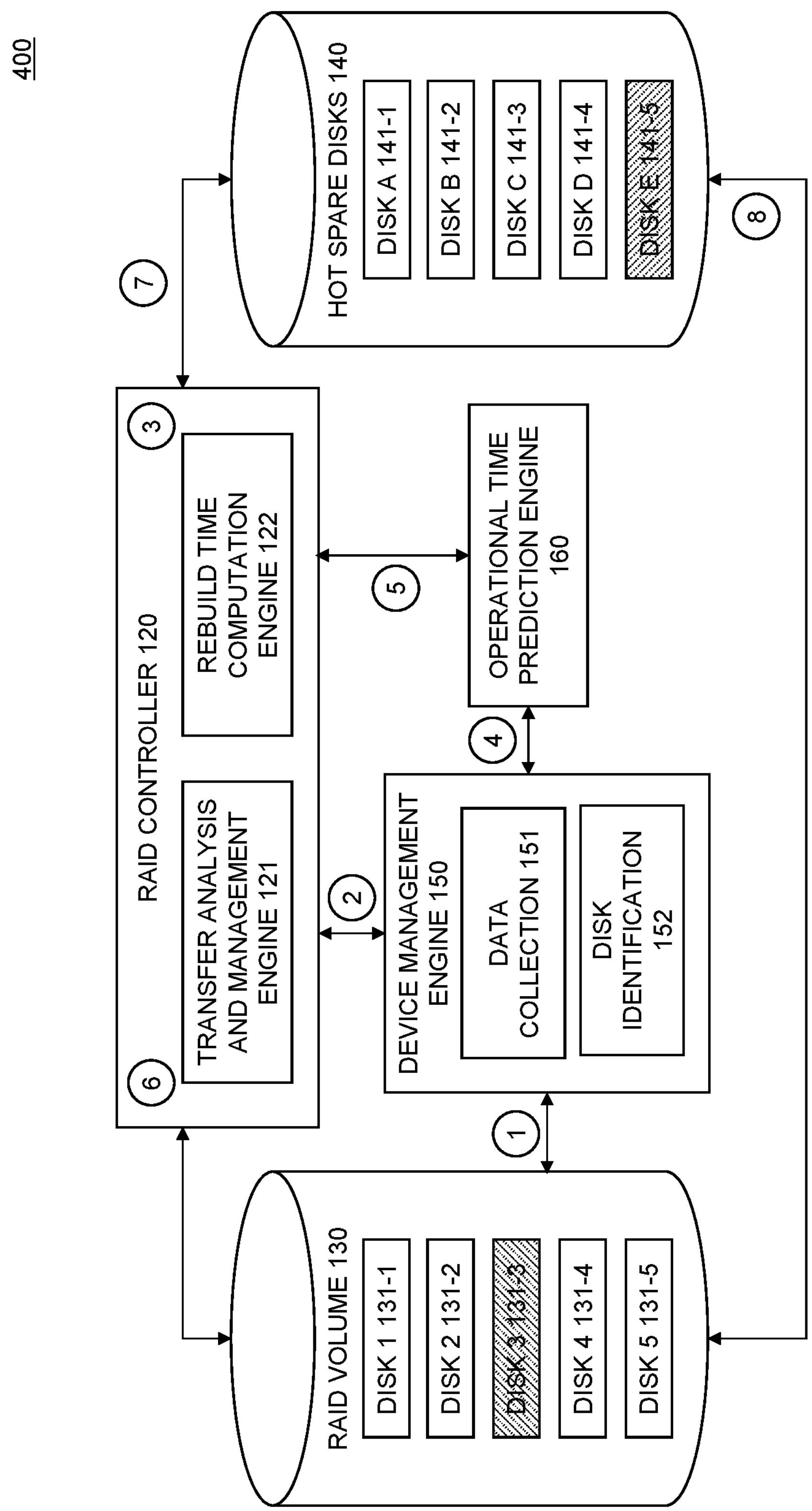
FIG. 4 depicts an operational flow for predicting and managing disk failure in an illustrative embodiment.

Referring to the operational flow 400 for predicting and managing disk failure in FIG. 4, it is assumed in a non-limiting operational example, that main disk 3 131-3 of the RAID volume 130 is identified as failing and is to be replaced by hot spare disk E 141-5. In accordance with the operational flow 400, at step 1, the data collection layer 151 monitors a computing environment including the RAID volume 130 to collect operational data of devices in the computing environment so that the disk identification layer 152 can identify one or more main disks 131 that may fail based on the collected operational data, which can include, for example, operational logs, performance metrics, alerts and device identifiers (e.g., universally unique identifiers (UUIDs)). At step 2, the RAID controller 120 is notified about a main disk (e.g., disk 3 131-3) that may fail (e.g., failing disk).

Some example log entries prior to failure of a main disk include reference to, for example, an error-correcting code (ECC), aborted operations, crashes, request time outs, network bounces, etc. Some of the references may be extracted from error messages. Reasons for disk failure may be detectable in clusters of log instances (e.g., errors, exceptions, critical log entries, etc.) across multiple logs.

At step 3, the RAID controller 120 reads the contents of the failing disk (e.g., metadata and data stored on the failing disk). Based on, for example, the amount of metadata and data stored on the failing disk (e.g., disk 3 131-3), the rebuild time computation engine 122 determines an amount of time required to rebuild the contents from the failing disk to a hot spare disk (e.g., disk E 141-5). In illustrative embodiments, the rebuild time computation engine 122 uses predefined policies to calculate the rebuild time. These policies correspond to, for example, data size in a given RAID and to designated types of storage devices. For example, referring to the table 500 in FIG. 5, if the disk sizes are 250 GB, 500 GB and 1000 GB for PowerStore® storage devices, then the rebuild times are approximately 7 hours, 14 hours and 27 hours, respectively. Accordingly, at least 7, 14 and 27 hours, respectively, should be allotted for 250, 500 and 1000 GB of data to be rebuilt on a hot spare disk. The time an operation to write the contents of a main disk to a hot spare disk is initiated is based at least in part on the computed rebuild time, which is sent to the operational time prediction engine 160. As can be seen in FIGS. 1 and 4, in illustrative embodiments, the transfer analysis and management engine 121 and the rebuild time computation engine 122 may be embedded as part of the RAID controller 120. However, the embodiments are not necessarily limited thereto, and one or more of the transfer analysis and management engine 121 and the rebuild time computation engine 122 may be separate components from the RAID controller 120.

At step 4, the operational time prediction engine 160 uses an identifier associated with the failing disk (e.g., UUID) to retrieve historical and current operational data corresponding to the failing disk (e.g., disk 3 131-3) from the device management engine 150. At step 5, using the conformal prediction techniques described hereinabove, the operational time prediction engine 160 predicts a time period when the failing disk will remain operational based at least in part on the historical and current operational data corresponding to the failing disk. The predicted time period is input to the RAID controller 120.

Referring to step 6, the transfer analysis and management engine 121 determines whether replacement of the failing disk (e.g., disk 3 131-3) with a hot spare disk (e.g., disk E 141-5) should be initiated or whether the failing disk can function for an additional period of time. Unlike conventional approaches, the transfer analysis and management engine 121 predicts the best time for a hot spare disk to be enabled before a main disk has failed.

In illustrative embodiments, the transfer analysis and management engine 121 analyzes the predicted survival time of the failing disk and compares it with a threshold time period. The threshold time period may be a designated or default value, which can be provided by an administrator via, for example, a user device 102, or automatically determined by, for example, the RAID controller 120. If the predicted survival time of the failing disk is less than the threshold time period, the transfer analysis and management engine 121 triggers onboarding of a hot spare disk and replacement of the failing disk. In other words, the operation to write the contents of the failing disk on the hot spare disk is initiated if the predicted survival time is less than the threshold time period.

If the predicted survival time of the failing disk is greater than the threshold time period, the rebuild time computation engine 122 re-computes an amount of time required to rebuild the contents from the failing disk to the hot spare disk based on an updated amount of the contents (e.g., data and metadata) on the failing disk. Referring back to step 3, as the contents on the failing disk may have changed since the previous reading, the RAID controller 120 re-reads the contents of the failing disk to retrieve the updated amount of the contents on the failing disk, and then steps 4-6 are performed again. In more detail, the operational time prediction engine 160 again retrieves historical and current operational data corresponding to the failing disk from the device management engine 150 and, using the conformal prediction techniques described hereinabove, the operational time prediction engine 160 predicts an updated time period when the failing disk will remain operational based at least in part on the newly retrieved historical and current operational data corresponding to the failing disk. As can be understood, the historical and current operational data corresponding to the failing disk dynamically changes over time, and subsequently retrieved operational data may differ from previously retrieved operational data.

Then, the transfer analysis and management engine 121 again determines whether replacement of the failing disk (e.g., disk 3 131-3) with a hot spare disk (e.g., disk E 141-5) should be initiated by comparing the updated predicted survival time with the threshold time period. The threshold checks and corresponding re-execution of the steps as described above are performed in one or more iterations until the predicted survival time of the failing disk is less than the threshold time period. This ensures that the RAID controller 120 does not initiate transfer to the hot spare disk before an optimal time and that the operation to transfer main disk contents to the hot spare disk is initiated at a proper time so that the main disk contents can be rebuilt on a hot spare disk prior to failure of the main disk.

Referring to step 7, once the predicted survival time of the failing disk is less than the threshold time period the operation to write the contents of the failing disk on the hot spare replacement disk is executed. Referring to step 8, once the contents are completely rebuilt on the hot spare disk (e.g., disk E 141-5), the RAID controller 120 activates the hot spare disk and retires (deactivates) the failing disk (e.g., disk 131-3).

In illustrative embodiments, the output engine 170 generates reports of failing disks and/or of transfer operations to hot spare disks for transmission to one or more users via the user devices 102. The reports provide details about the reasons for potential failure and the predicted survival times of the failing disks.

According to one or more embodiments, caches, data repositories or databases referred to herein can be configured according to a relational database management system (RDBMS) (e.g., PostgreSQL). In some embodiments, the caches, data repositories or databases referred to herein are implemented using one or more storage systems or devices associated with the RAID management platform 110. In some embodiments, one or more of the storage systems utilized to implement the caches, data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the RAID management platform 110, the RAID controller 120, RAID volume 130, hot spare disks 140, device management engine 150, operational time prediction engine 160 and/or output engine 170 in other embodiments can be implemented at least in part externally to the RAID management platform 110, for example, as stand-alone servers, sets of servers or other types of systems coupled to the network 104. For example, the RAID controller 120, RAID volume 130, hot spare disks 140, device management engine 150, operational time prediction engine 160 and/or output engine 170 may be provided as cloud services accessible by the RAID management platform 110.

The RAID controller 120, RAID volume 130, hot spare disks 140, device management engine 150, operational time prediction engine 160 and/or output engine 170 in the FIG. 1 embodiment are each assumed to be implemented using at least one processing device. Each such processing device generally comprises at least one processor and an associated memory, and implements one or more functional modules for controlling certain features of the RAID controller 120, RAID volume 130, hot spare disks 140, device management engine 150, operational time prediction engine 160 and/or output engine 170.

At least portions of the RAID management platform 110 and the elements thereof may be implemented at least in part in the form of software that is stored in memory and executed by a processor. The RAID management platform 110 and the elements thereof comprise further hardware and software required for running the RAID management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the RAID controller 120, RAID volume 130, hot spare disks 140, device management engine 150, operational time prediction engine 160, output engine 170 and other elements of the RAID management platform 110 in the present embodiment are shown as part of the RAID management platform 110, at least a portion of the RAID controller 120, RAID volume 130, hot spare disks 140, device management engine 150, operational time prediction engine 160, output engine 170 and other elements of the RAID management platform 110 in other embodiments may be implemented on one or more other processing platforms that are accessible to the RAID management platform 110 over one or more networks. Such elements can each be implemented at least in part within another system element or at least in part utilizing one or more stand-alone elements coupled to the network 104.

It is assumed that the RAID management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the RAID controller 120, RAID volume 130, hot spare disks 140, device management engine 150, operational time prediction engine 160, output engine 170 and other elements of the RAID management platform 110, and the elements thereof can each be implemented in the form of one or more LXCs running on one or more VMs. Other arrangements of one or more processing devices of a processing platform can be used to implement the RAID controller 120, RAID volume 130, hot spare disks 140, device management engine 150, operational time prediction engine 160 and output engine 170, as well as other elements of the RAID management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the RAID management platform 110 to reside in different data centers. Numerous other distributed implementations of the RAID management platform 110 are possible.

Accordingly, one or each of the RAID controller 120, RAID volume 130, hot spare disks 140, device management engine 150, operational time prediction engine 160, output engine 170 and other elements of the RAID management platform 110 can each be implemented in a distributed manner so as to comprise a plurality of distributed elements implemented on respective ones of a plurality of compute nodes of the RAID management platform 110.

It is to be appreciated that these and other features of illustrative embodiments are presented by way of example only, and should not be construed as limiting in any way. Accordingly, different numbers, types and arrangements of system elements such as the RAID controller 120, RAID volume 130, hot spare disks 140, device management engine 150, operational time prediction engine 160, output engine 170 and other elements of the RAID management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the RAID management platform can be offered to cloud infrastructure customers or other users as part of FaaS, CaaS and/or PaaS offerings.

Figure 6:
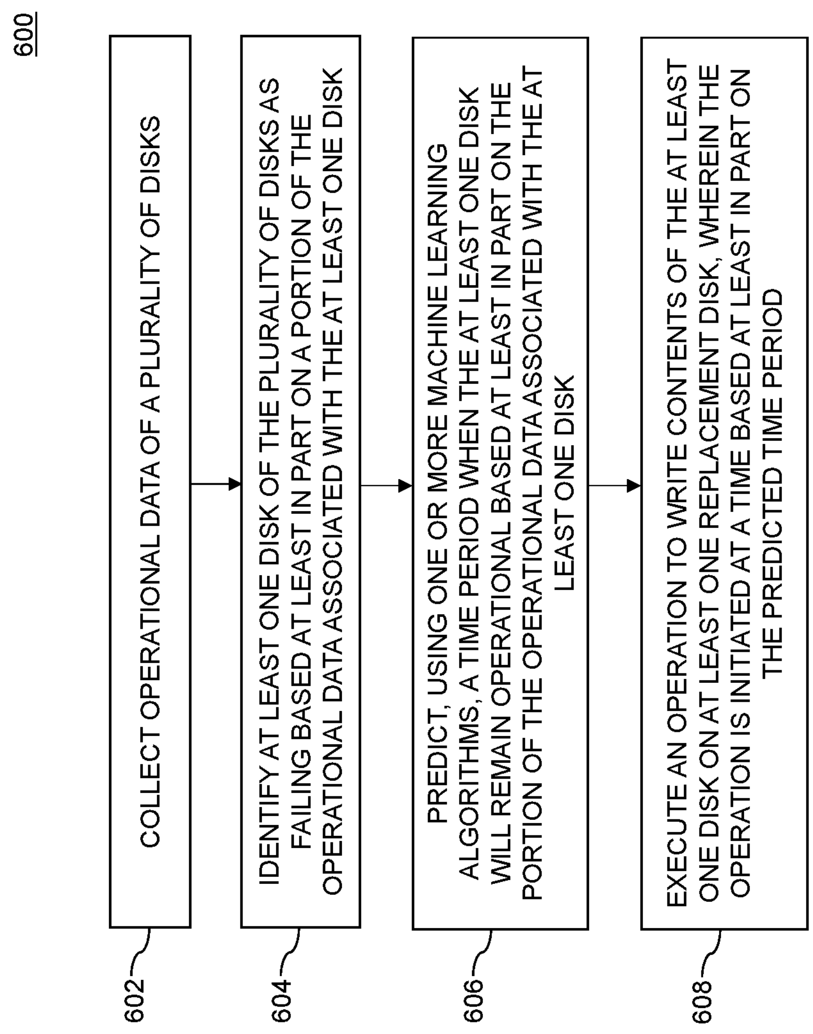
FIG. 6 depicts a process for RAID management according to an illustrative embodiment.

The operation of the information processing system 100 will now be described in further detail with reference to the flow diagram of FIG. 6. With reference to FIG. 6, a process 600 for RAID management as shown includes steps 602 through 608, and is suitable for use in the system 100 but is more generally applicable to other types of information processing systems comprising a RAID management platform configured for RAID management.

In step 602, operational data of a plurality of disks is collected. In step 604, at least one disk of the plurality of disks is identified as failing based at least in part on a portion of the operational data associated with the at least one disk. The at least one disk is part of a RAID.

In step 606, using one or more machine learning algorithms, a time period when the at least one disk will remain operational is predicted based at least in part on the portion of the operational data associated with the at least one disk. In illustrative embodiments, the portion of the operational data comprises at least one of one or more performance metrics associated with the at least one disk and one or more alerts corresponding to one or more issues with the at least one disk. The one or more performance metrics comprise, for example, at least one of IOPS, throughput and latency.

In step 608, an operation to write contents of the at least one disk on at least one replacement disk is executed. The operation is initiated at a time based at least in part on the predicted time period. For example, the operation is initiated is based at least in part on the operation being completed before expiration of the predicted time period.

In illustrative embodiments, the one or more machine learning algorithms utilize a conformal prediction technique, and comprise, for example, a Mondrian forest model. The predicting of the time period when the at least one disk will remain operational comprises, for example, computing a non-conformity score for a semi-parametric Mondrian forest, determining one or more uncertainties for a prediction, and translating the one or more uncertainties into a confidence interval for the prediction.

In one or more embodiments, the process also comprises reading the contents of the at least one disk, and computing an amount of time required to write the contents of the at least one disk on the at least one replacement disk. The contents of the at least one disk comprise, for example, metadata and data. The time the operation is initiated is further based at least in part on the amount of time required to write the contents of the at least one disk on the at least one replacement disk. The computing is based at least in part on an amount of the data and the metadata on the at least one disk and/or a type of the at least one disk.

In illustrative embodiments, the predicted time period is compared to a designated threshold time period. If the predicted time period is less than the designated threshold time period, the operation to write the contents of the at least one disk on the at least one replacement disk is initiated. If the predicted time period is greater than the designated threshold time period, the amount of time required to write the contents of the at least one disk on the at least one replacement disk is recomputed. The recomputing is based on an updated amount of the data and the metadata on the at least one disk.

If the predicted time period is greater than the designated threshold time period, using the one or more machine learning algorithms, an updated time period when the at least one disk will remain operational is predicted based at least in part on updated operational data associated with the at least one disk. The updated predicted time period is compared to the designated threshold time period. The operation to write the contents of the at least one disk on the at least one replacement disk is initiated if the updated predicted time period is less than the designated threshold time period. The predicting of the updated time period and the comparing of the updated predicted time period to the designated threshold time period are iteratively repeated until the updated predicted time period is less than the designated threshold time period.

It is to be appreciated that the FIG. 6 process and other features and functionality described above can be adapted for use with other types of information systems configured to execute RAID management services in a RAID management platform or other type of platform.

The particular processing operations and other system functionality described in conjunction with the flow diagram of FIG. 6 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a RAID management platform as disclosed herein can provide a number of significant advantages relative to conventional arrangements. For example, the RAID management platform effectively uses machine learning techniques to predict remaining operational life of disks identified as potentially failing. The embodiments advantageously analyze disk operational data in a conformal prediction framework to determine an optimal time to replace a failing disk with a healthy disk before disk failure. As a result, the embodiments enable more efficient use of compute resources, improve performance and reduce or eliminate downtime since operations to transfer disk contents to a replacement disk are initiated and completed before failure of a disk.

The embodiments advantageously use machine learning algorithms to evaluate the operational data to predict disk issues. Unlike conventional techniques, which react to disk failures, the embodiments provide a framework for proactively predicting disk failure and addressing potential failure before disks are no longer operational. As an additional advantage, unlike current approaches, the embodiments provide a framework to intelligently predict how long a disk may remain operational and use that prediction to determine when to onboard a hot spare disk.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the RAID management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a RAID management platform in illustrative embodiments. These and other cloud-based systems in illustrative embodiments can include object stores.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
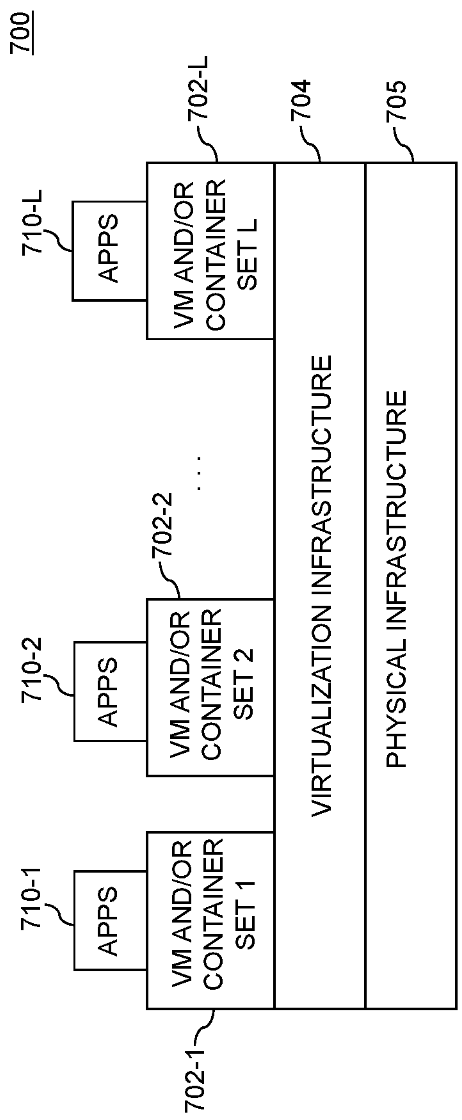
FIGS. 7 and 8 show examples of processing platforms that may be utilized to implement at least a portion of an information processing system according to illustrative embodiments.
Figure 8:
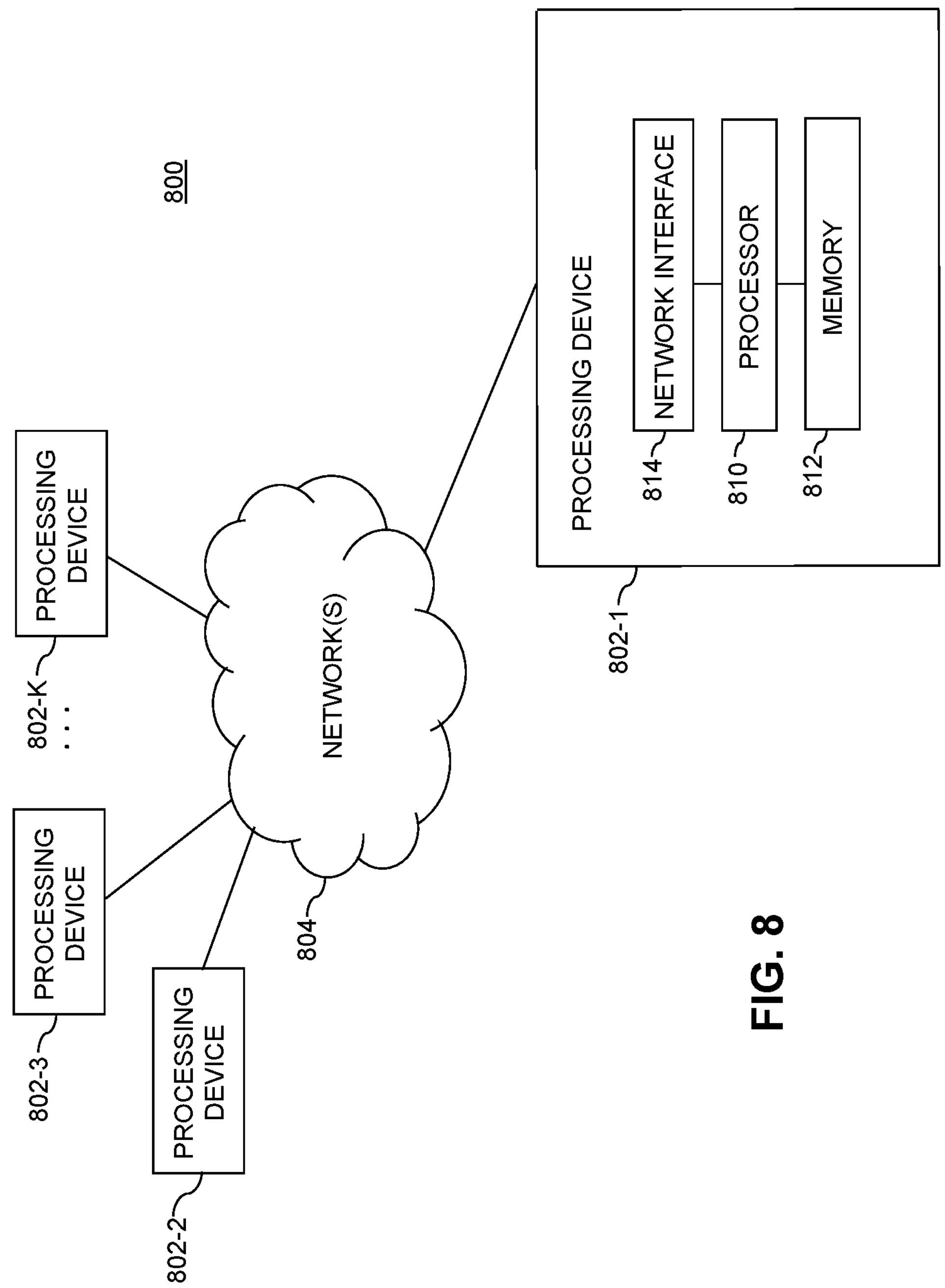

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the RAID management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and RAID management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

collecting operational data of a plurality of disks;

identifying at least one disk of the plurality of disks as failing based at least in part on a portion of the operational data associated with the at least one disk;

predicting, using one or more machine learning algorithms, a time period when the at least one disk will remain operational based at least in part on the portion of the operational data associated with the at least one disk;

executing an operation to write contents of the at least one disk on at least one replacement disk, wherein the executing comprises:

comparing the predicted time period to a designated threshold time period; and initiating the operation to write the contents of the at least one disk on the at least one replacement disk if the predicted time period is less than the designated threshold time period;

determining that the predicted time period is greater than the designated threshold time period;

predicting, using the one or more machine learning algorithms, an updated time period when the at least one disk will remain operational based at least in part on updated operational data associated with the at least one disk;

comparing the updated predicted time period to the designated threshold time period; and iteratively repeating the predicting of the updated time period and the comparing of the updated predicted time period to the designated threshold time period until the updated predicted time period is less than the designated threshold time period;

wherein the steps of the method are executed by a processing device operatively coupled to a memory.

2. The method of claim 1 wherein a time the operation is initiated is based at least in part on the operation being completed before expiration of the predicted time period.

3. The method of claim 1 wherein the portion of the operational data comprises at least one of one or more performance metrics associated with the at least one disk and one or more alerts corresponding to one or more issues with the at least one disk.

4. The method of claim 3 wherein the one or more performance metrics comprise at least one of input-output operations per second (IOPS), throughput and latency.

5. The method of claim 1 wherein the one or more machine learning algorithms utilize a conformal prediction technique.

6. The method of claim 1 wherein the one or more machine learning algorithms comprise a random forest model, and wherein the predicting comprises:

computing a non-conformity score for a semi-parametric random forest;

determining one or more uncertainties for a prediction; and translating the one or more uncertainties into a confidence interval for the prediction.

7. The method of claim 1 wherein the at least one disk is part of a redundant array of independent disks (RAID).

8. The method of claim 1 further comprising:

reading the contents of the at least one disk; and computing an amount of time required to write the contents of the at least one disk on the at least one replacement disk;

wherein the contents of the at least one disk comprise at least metadata and data.

9. The method of claim 8 wherein a time the operation is initiated is based at least in part on the amount of time required to write the contents of the at least one disk on the at least one replacement disk.

10. The method of claim 8 wherein the computing is based at least in part on one or more of an amount of the data and the metadata on the at least one disk and a type of the at least one disk.

11. The method of claim 10 further comprising:

recomputing the amount of time required to write the contents of the at least one disk on the at least one replacement disk in response to the predicted time period being greater than the designated threshold time period, wherein the recomputing is based on an updated amount of the data and the metadata on the at least one disk.

12. The method of claim 1 further comprising:

initiating the operation to write the contents of the at least one disk on the at least one replacement disk in response to the updated predicted time period being less than the designated threshold time period.

13. An apparatus comprising:

a processing device operatively coupled to a memory and configured:

to collect operational data of a plurality of disks;

to identify at least one disk of the plurality of disks as failing based at least in part on a portion of the operational data associated with the at least one disk;

to predict, using one or more machine learning algorithms, a time period when the at least one disk will remain operational based at least in part on the portion of the operational data associated with the at least one disk;

to execute an operation to write contents of the at least one disk on at least one replacement disk, wherein in executing the operation, the processing device is configured:

to compare the predicted time period to a designated threshold time period; and to initiate the operation to write the contents of the at least one disk on the at least one replacement disk in response to the predicted time period being less than the designated threshold time period;

to determine that the predicted time period is greater than the designated threshold time period;

to predict, using the one or more machine learning algorithms, an updated time period when the at least one disk will remain operational based at least in part on updated operational data associated with the at least one disk;

to compare the updated predicted time period to the designated threshold time period; and to iteratively repeat the predicting of the updated time period and the comparing of the updated predicted time period to the designated threshold time period until the updated predicted time period is less than the designated threshold time period.

14. The apparatus of claim 13 wherein the processing device is further configured:

to initiate the operation to write the contents of the at least one disk on the at least one replacement disk in response to the updated predicted time period being less than the designated threshold time period.

15. The apparatus of claim 13 wherein a time the operation is initiated is based at least in part on the operation being completed before expiration of the predicted time period.

16. The apparatus of claim 13 wherein the processing device is further configured:

to read the contents of the at least one disk; and to compute an amount of time required to write the contents of the at least one disk on the at least one replacement disk;

wherein the contents of the at least one disk comprise at least metadata and data.

17. The apparatus of claim 16 wherein a time the operation is initiated is based at least in part on the amount of time required to write the contents of the at least one disk on the at least one replacement disk.

18. An article of manufacture comprising a non-transitory processor-readable storage medium having stored therein program code of one or more software programs, wherein the program code when executed by at least one processing device causes said at least one processing device to perform steps of:

collecting operational data of a plurality of disks;

identifying at least one disk of the plurality of disks as failing based at least in part on a portion of the operational data associated with the at least one disk;

predicting, using one or more machine learning algorithms, a time period when the at least one disk will remain operational based at least in part on the portion of the operational data associated with the at least one disk;

executing an operation to write contents of the at least one disk on at least one replacement disk, wherein the executing comprises:

comparing the predicted time period to a designated threshold time period; and initiating the operation to write the contents of the at least one disk on the at least one replacement disk in response to the predicted time period being less than the designated threshold time period;

determining that the predicted time period is greater than the designated threshold time period;

predicting, using the one or more machine learning algorithms, an updated time period when the at least one disk will remain operational based at least in part on updated operational data associated with the at least one disk;

comparing the updated predicted time period to the designated threshold time period; and iteratively repeating the predicting of the updated time period and the comparing of the updated predicted time period to the designated threshold time period until the updated predicted time period is less than the designated threshold time period.

19. The article of manufacture of claim 18 wherein the program code further causes said at least one processing device:

to initiate the operation to write the contents of the at least one disk on the at least one replacement disk in response to the updated predicted time period being less than the designated threshold time period.

20. The article of manufacture of claim 18 wherein the program code further causes said at least one processing device to perform the steps of:

reading the contents of the at least one disk; and computing an amount of time required to write the contents of the at least one disk on the at least one replacement disk;

wherein the contents of the at least one disk comprise at least metadata and data.

* * * * *